June 10, 1952 W. C. ROBINETTE 2,600,170
MOLECULAR RESISTANCE MOTOR CONTROL DEVICE
Original Filed Feb. 16, 1943 2 SHEETS—SHEET 2
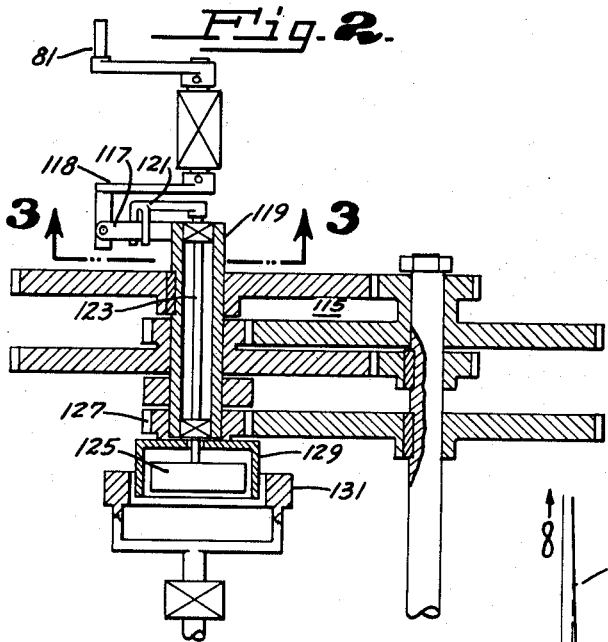
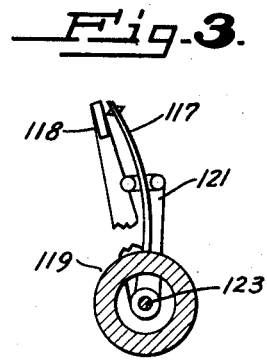
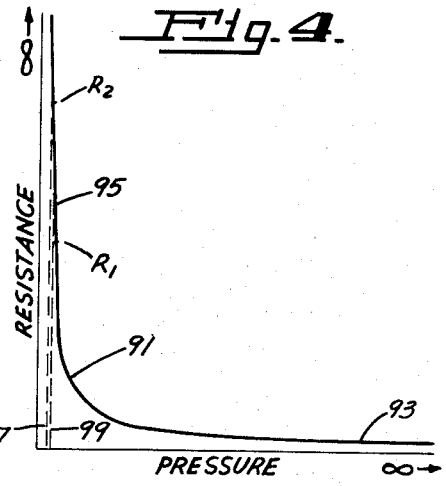
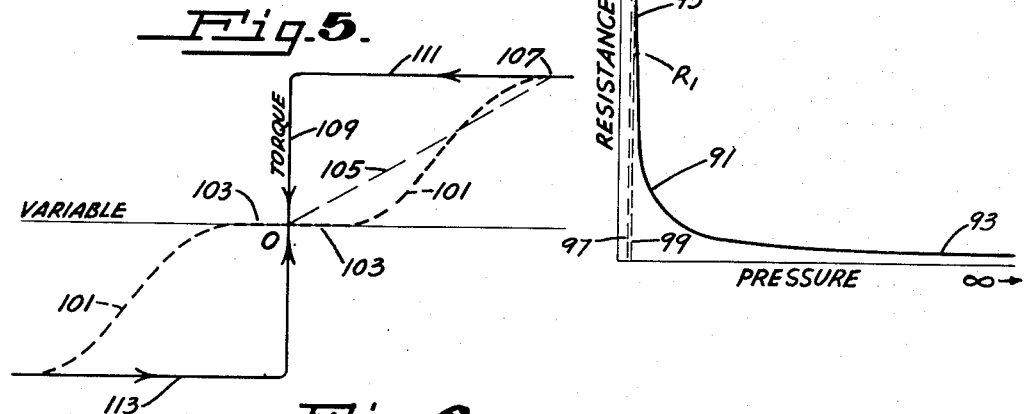
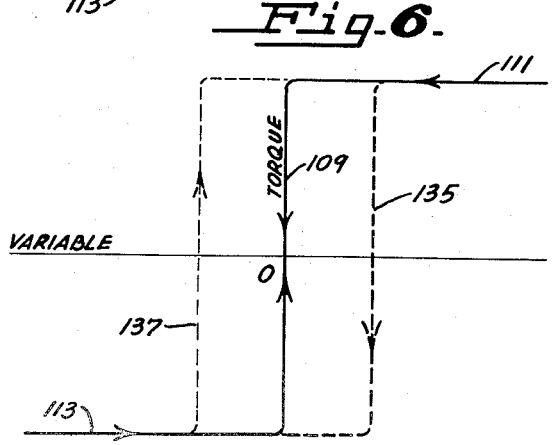
INVENTOR.
WILLARD C. ROBINETTE
BY Herbert E. Metcalf
ATTORNEY Patented June 10, 1952

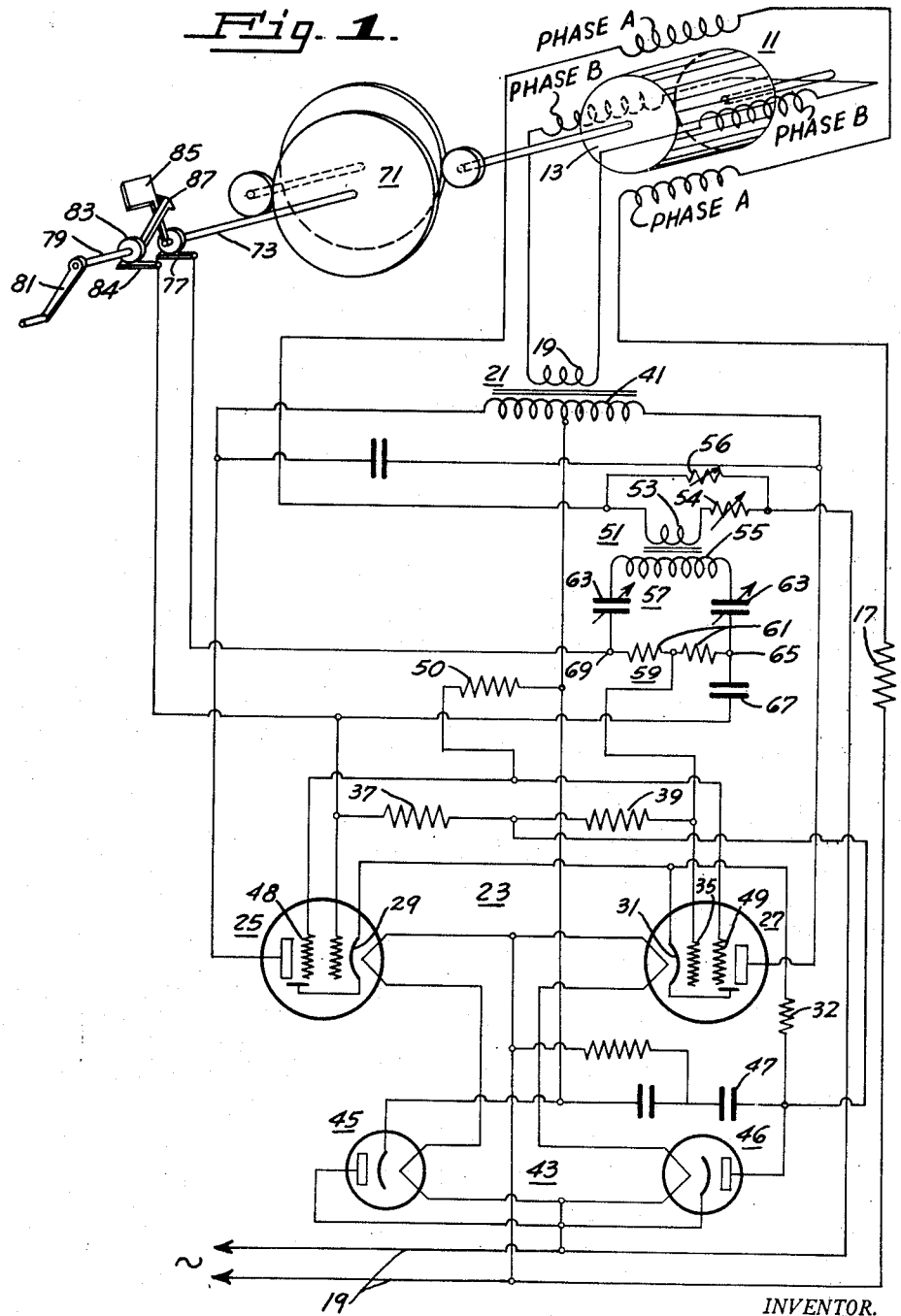

2,600,170

UNITED STATES PATENT OFFICE 2,600,170

MOLECULAR RESISTANCE MOTOR CONTROL DEVICE

Willard C. Robinette, South Pasadena, Calif.

Continuation of application Serial No. 476,126, February 16, 1943. This application December 19, 1949, Serial No. 133,890. In Canada May 15, 1944

3 Claims. (Cl. 318—31)

My invention relates to motor controls and more particularly to molecular resistance control of induction motors.

Among the objects of my invention are:

(a) To provide novel and improved means and method for controlling speed and torque of an induction motor.

(b) To provide novel and improved means and method for controlling speed and torque of an induction motor without necessarily resorting to use of separable contacts or intervening mechanical moving parts.

(c) To provide novel and improved electronic control means for induction motors.

(d) To provide novel and improved electronic control means.

(e) To provide novel and improved induction motor control apparatus having exceedingly high amplification ratio.

(f) To provide novel and improved induction motor control apparatus having an exceptionally high degree of sensitivity and response.

(g) To provide novel and improved induction motor control apparatus of minimum bulk and light weight.

(h) To provide a novel and improved induction motor electronic control system wherein the primary motor load current does not pass through the electronic tube equipment.

(i) To provide novel and improved control means and method for induction motors, wherein the control power may be as little as $\frac{1}{20}$ to $\frac{1}{100}$ of the total power input to the motor.

(j) To provide novel and improved balance seeking means and method.

(k) To provide novel and improved balance seeking means and method wherein the balance seeking torque is frequency modulated, rather than amplitude modulated as in conventional practice.

(l) To provide novel and improved induction motor control appaartus incorporating the combined features of the previous objects.

The present application is a continuation of my co-pending application Serial No. 476,126, filed February 16, 1943, now matured into Patent No. 2,505,258, issued April 25, 1950, for Electronic Control.

Additional objects of my invention will be brought out in the following description of the same taken in conjunction with the accompanying drawings wherein:

Figure 1 is a combined schematic and diagrammatic view illustrating a preferred embodiment of my invention and one of its applications.

Figure 2 is a view partly in section of a compensated control mechanism applicable in the system of Figure 1.

Figure 3 is an enlarged view of a detail of the compensated control mechanism of Figure 2 taken on the line 3—3 of Figure 2.

Figure 4 is a resistance-pressure characteristic curve of a pair of contacts, and referred to in explaining certain features of considerable importance involved in my invention.

Figure 5 is a diagram enabling comparison between the sensitivity of my improved apparatus and method and those of the prior art.

Figure 6 is a diagram illustrating the theory underlying the compensated control mechanism of Figure 2.

My invention is particularly applicable to induction motors of the two-phase or the single-phase type with starting winding.

In induction motors, conventional operation is realized by linking a rotor with the magnetic flux of a rotating field. In a two-phase induction motor, much rotating field is realized by disposing the respective phase windings in quadrature with respect to each other, usually on the stator of the machine and feeding current to one phase winding 90° out of phase with the current supplied to the other phase winding. The direction of rotation of the rotor, according to textbooks, is determined by whether the current in the one phase leads or lags the current in the other phase.

The torque developed by an induction motor is the result of the reaction between the current induced in the rotor and the rotating field. The current induced in the rotor is a function of the speed of the rotor or, as it is sometimes stated, it is a function of the slip, which is the difference between the rotative speed of the field and the rotation of the rotor attributable to the load on the machine.

It is generally known that induction motors possess very low starting torque, this being an inherent disadvantage of machines of this character. In motors of the wound rotor type, the starting torque may be increased through the addition of resistance to the rotor circuit, but for efficiency in operation such resistance must be removed after the motor has been brought up to normal running speed. An induction motor of the squirrel-cage type, on the other hand, does not conveniently permit of the variation of the resistance of its rotor circuit and consequently its utility is limited to the handling of loads within the normal torque of such motors.

I have found that the operating characteristics of an induction motor can be very conveniently and adequately controlled through manipulation of the current and voltage in one of the phase windings, and correlating the same to the current or magnetic flux in the other phase winding. For example, by controlling the excitation in one phase winding and causing it to harmonize at all times with the power factor existing in the other phase winding of the motor, I am able to maintain a more uniformly increased torque for all speeds of the motor over conventional operation.

I have also found that by distorting the current or voltage applied to one phase winding of the machine, so as to introduce a heavy harmonic content involving particularly the odd harmonics up to a substantial value and in a particular phase relationship to the fundamental, that the torque of the machine may be increased considerably above what would be developed by the fundamental only.

I have been able to realize the above results, as well as the ability to reverse at will the direction of rotation of the machine, through the design and application of a very simple control circuit, a preferred embodiment of which will now be described in conjunction with the drawings.

In Figure 1, I have schematically shown an induction motor 11 of the type having a squirrel-cage rotor 13; and having illustrated the two phase windings which have been designated phase A and phase B, as being disposed in quadrature with respect to each other. One of these windings, namely, the phase A winding, is fed directly from an alternating current power source, preferably through a series voltage dropping impedance 17 in one of the phase A lines 19. The phase B winding is fed from the secondary 19 of a transformer 21 in the output of a power amplifier 23, the grid excitation of which is determined in accordance with the current flowing in the phase A winding.

This amplifier, preferably, comprises a pair of beam pentodes 25 and 27 connected in push-pull; that is, the cathodes 29 and 31, respectively, are connected together and preferably grounded through a current-limiting bias resistor 32, while the grids 33 and 35 are connected to the B-return, each through its respective leak 37 and 39, while the primary winding 41 of the output transformer 21 is center tapped and connected to a suitable source of potential.

A voltage doubling electronic rectifier circuit 43 is ideally suited as such source of potential, and may include two half wave rectifier tubes 45 and 46, respectively, each connected to the phase A lines 19 and developing a direct current voltage across one of a pair of series connected condensers 47 in the same direction, whereby the voltage across the two condensers will be double that obtained by a single tube. This voltage doubler circuit is more or less conventional as such, but possesses characteristics which ideally suit it for use in combination with the push-pull circuit of my system.

The screen grids 48 and 49 of the amplifier 23 are preferably connected in parallel to the source of potential 43 through a voltage dropping resistor 50.

The voltage to be amplified is applied across the grid leaks 37 and 39 in series, whereby it appears 180° out of phase on the grids 33 and 35.

The excitation voltage for this power amplifier, as previously indicated, is determined in accordance with the current or magnetic flux in the phase A winding of the motor. This is realized by providing a grid step-up transformer 51 with a low impedance primary winding 53 connected in series with the phase A winding, so that as the power factor in phase A changes with torque on the motor, as it necessarily will do with variations in load, the grid excitation of the amplifier changes also in step with such changes in power factor. Thus, the control voltage across phase B winding, as impressed thereon by the amplifier 23, will always remain in a given phase relationship with the magnetic flux or current in phase A.

A variable resistor 54 in series with the primary winding 53 provides manually controllable means for adjusting the phase angle of the primary current.

Textbooks indicate that the reversal of rotation of an induction motor of the two-phase type may be accomplished by reversing the relative phase relationship of the fundamental voltage supplied to the phase windings, such voltages being customarily applied to the different phase windings from different voltage sources, ninety degrees out of phase with each other. Under such conventional practice the power input per phase is substantially the same for each winding.

I have found that by distorting the voltage input to one of the windings, such as the phase B winding, and introducing it into that winding at a phase angle which varies with the power factor of the other phase winding; namely the phase A winding, a motor may be controlled with only a small fractional portion of the total power input to the motor. It is highly desirable in obtaining such control, and particularly in seeking a reversal of rotation of a motor, that a heavy harmonic content exist and that certain of the harmonics shall predominate and occupy predetermined phase relationships to the fundamental.

A second factor which must be taken into consideration is the phase relationship between the fundamental of the amplifier excitation and the voltage in phase B winding induced by transformer action from phase A winding.

As for the harmonic relationships, I am not at present able to set forth a general rule as to what such harmonics and phase relationships should be, except to point out that generally when such conditions exist, the Lissajous figure on the screen of a cathode ray tube, produced by applying the phase B current to one set of plates and the phase A current to the other set of plates, approaches that of a rectangle.

As regards the phase relationships between the fundamental of the amplifier excitation voltage and the induced voltage in phase B winding derived from the phase A winding, I have discovered through experimentation that maximum running efficiency is realized when the fundamental of such excitation voltage is out of phase with the voltage induced into the phase B winding from the phase A winding, and I have further discovered that by reversing the fundamental of the excitation voltage to bring it into phase with the phase B winding induced voltage, a heavy current is caused to flow in phase B winding which apparently sets up a field in opposition to the field from phase A winding, by reason of which a sharp decrease in speed of the motor is affected, which within a matter of a few seconds reaches zero R. P. M.

This is not to be confused with conventional practice of reversing the voltage input to one winding to reverse the direction of rotation when the phase windings are supplied from separate source and equally, for I have demonstrated through further experimentation that by shorting one winding, such as phase B winding, the motor will come to a quick stop. I have further established that this is due to the heavy current which such shorting of the winding produces. For lack of more expressive terminology, this phenomenon is termed by me "magnetic blocking." In utilizing this phenomenon in my system, I am able to make the motor supply the major portion of the power necessary to bring it to a stop.

Thus, in general terms, the ability of the system to stop and control direction of motor rotation rests on the procedure of (1) supplying proper phase and proportion of higher harmonics to cause substantial reverse torque, and (2) producing a high deceleration of the rotor by causing the fundamental of phase B excitation to free and at the same time assist the induced voltage in said winding in its "magnetic blocking" action.

I have furthermore discovered that when the proper harmonics and phase relationships exist, as just discussed, the torque of the motor will have been increased a substantial amount (for a given voltage), in fact, in excess of the maximum torque which one could hope for in accordance with present day theory and practice. One explanation of this phenomenon is offered, although I do not wish to be bound by the same, inasmuch as other reasons may exist for the result which I have observed.

Some distortion of a fundamental current wave may generally occur in an induction motor, and in varying degrees, depending upon its magnetic properties and field distribution. To such distortion I add considerable additional distortion in my system through the provision of grid step-up transformer 51 which is preferably designed to operate somewhere close to the knee of its saturation curve at substantially full load current. Considerable distortion will therefore appear in the voltage wave across the secondary 55 of the grid step-up transformer 51, particularly under conditions approaching full load operation of the rotor. The amount of distortion is controllable through the adjustment of a variable resistor 56 connected across the primary winding 53, its presence enabling one to select the most advantageous point of operation on the magnetic saturation curve of the transformer 51.

To obtain a suitable voltage wave for application to the grids 33—35 of the power amplifier, which waves shall embody those harmonics and in proper phase relationship to the fundamental, which will produce the generally desired Lissajous figure on the screen of a cathode ray tube, it is necessary to stress the proper harmonics developed in the output of the grid step-up transformer 51 and arrange them into proper phase with the fundamental. Toward this end, I interpose between the transformer 51 and the grids 33—35 of the power amplifier tubes, a harmonic phase shift and accentuating circuit 57 in combination with a phase shift circuit 59, which latter functions to shift both the phase of the fundamental and its harmonics with respect to the current in the other phase A winding of the motor. These circuits may vary somewhat with the particular motor to be controlled, but in general it appears that the odd harmonics of the fundamental should predominate and lag the fundamental voltage vector crosses the zero angle or time axis.

Accordingly, one might connect the secondary 55 of the grid step-up transformer 51 across a resistance 61, and tune this circuit broadly with a pair of series condensers 63, to a frequency which will cause higher harmonics to lag the fundamental. In this manner such harmonics may be rearranged into the proper phase relationship to the fundamental.

The resistance 61 may be center tapped and connected from this point to one of the grids 35, for example of the power amplifier, while one end 65 of the resistor 61 may be connected through a condenser 57 to the other grid 33 of the amplifier. Under these conditions the voltages applied across the grid leaks 37—39 in series, or in other words to the input of the power amplifier, will be the vector sum of the voltages appearing across one half of the resistance 61 and the condenser 57 in series. These voltages are also equal to the vector sum of the voltages across the other half of the resistance 61 and the voltage between the other end 69 of this resistance and the grid 33 of the power amplifier tube to which the condenser 67 is connected, the latter voltage representing a drop across a substantially infinite resistance, if the circuit between grid 33 and point 69 is open.

If this infinite resistance is substantially lowered in value, a decided shift in the phase of the voltage applied to the input of the amplifier may be effected, and such change may be sufficient to shift the voltage in phase B winding of the motor from, say, substantially leading to substantially lagging with respect to the current in the phase A winding of the motor, thereby to effect a reversal in direction of rotation of the machine, with conditions existing as previously discussed.

Across such infinite resistance, therefore, one might connect a photocell whose resistance may be controlled by a light beam from a value approaching infinity to a value of but a relatively few ohms, or one might connect across such infinite resistance a pair of open contacts which are adapted to be closed under light pressure to alter the resistance from a value of substantially infinity to a value low enough to effect a reversal of rotation of the machine. I have found that the lower value of resistance which will effect a reversal of rotation of the motor, while low compared to infinite resistance value, may still be of the order of millions of ohms. Such values are comparable to the range of resistance values developed across the lightest of contact, in response to a microscopic change in pressure sufficient only to alter by a few molecules the number in engagement between contacting elements.

This latter feature forms an important part of the follow-up arrangement disclosed in Figure 1 whereby an extremely sensitive control may be maintained upon an induction motor, and essentially infinite amplification may be realized. In accordance with this arrangement, the induction motor 11 is connected through a high ratio speed reduction gear train 71 to a slow speed shaft 73 on which is mounted a slip ring 75. This slip ring is connected through a brush 77 to the end 69 of the resistance 61.

In axial alinement with this shaft is another shaft 79 supported independently and capable of independent rotation, either manually by means of a crank 81 or through the use of some other agency. This shaft is also provided with a slip ring 83, which is connected through a brush 84 to the grid 33.

Each of the shafts 73 and 79 carries a radially supported contact 85 and 87, respectively, which is electrically connected to its associated slip ring. The contact 85 is preferably in the form of a disc or plate, while the other contact may be sharp to assure proper contact function between the two. From this, it will be apparent that as the induction motor is started up, these contacts will be brought together and when the molecular resistance approaches a value sufficiently low to reverse the grid potential on the push-pull amplifier, such reversal takes place and consequently the potential applied to the phase B winding of the induction motor will be reversed.

The effect of the reversal of the phase B winding potential, as previously indicated, is to rapidly decelerate the motor and reverse the direction of its operation. However, due to the wide range of resistance values afforded by the change in molecular resistance between the contacts, the motor will, in effect, come to a stop with no apparent change in the relationship of the contacts other than the microscopic and imperceptible oscillation of pressure between the contacts sufficient to change the molecular resistance back and forth over a range necessary to effect a continuous repetition of the reversal of the voltage applied to the push-pull amplifier.

The pressure values involved are so slight that their absolute values are incapable of determination. The contacts appear to, and actually do, remain in continuous engagement under these conditions, the pressure between the contacts being the only variable to effect the resistance. Under these conditions, should one separate the contacts by rotation of the independent shaft 79, the motor will rotate to cause its associated contact 85 to follow in an attempt to catch up and again engage the outer contact 87. Thus, the average R. P. M. of the motor may be controlled by the rate of rotation imparted to the independent shaft 79, or the motor may be caused to stop in any angular position in accordance with the control exercised over the position of the manually shiftable contact 87.

Since the balancing resistance depends upon the contact of but a relatively few molecules, it follows that if the controlled contact 87 be influenced to bring about a change in the number of molecules in contact, the motor will function to reestablish the original number of molecules in contact, even though the functioning of the motor under these conditions might involve imperceptible motion of its rotor of the order of a fraction of a second of arc or less than $\frac{1}{3600}$ of a degree. During a balanced condition, the motor torque and consequently the motor, maintains continuous high frequency molecular excursions at the contacts. This, in effect, creates or constitutes a "static condition of dynamic instability."

A thorough understanding of this phase of my invention may more readily be appreciated through a comparison with control or balance seeking devices of the prior art.

In Figure 4 I have depicted a typical "resistance-pressure" curve 91 for a pair of contacts such as those associated with conventional relays, etc. The open condition of the contacts is represented on this curve by infinite resistance at zero pressure, while the closed condition of the contacts is represented by a point of finite pressure and exceedingly low resistance which will appear at a substantial distance to the right on the horizontal branch 93 of the curve.

In my system, I take advantage of a portion of any curve having a substantially infinite slope, which in the curve of Figure 4, is represented by the vertical branch 95 only of the curve, whereby an exceedingly wide range of resistance, such as $R_1$ to $R_2$ on the curve, may be covered by an extremely minute range of pressure, so microscopic as to produce a change in contact of but a few molecules. Such pressure range is represented by the distance between the broken lines 97 and 99. The values $R_1$ and $R_2$ might, in an actual case, be of the order of $(1 \text{ to } 2) \times 10^5$ ohms and $(1 \text{ to } 5) \times 10^6$ ohms respectively.

The significance of operating on an infinite slope portion of a curve may be observed from Figure 5 which, by comparison with prior conventional methods, brings out the relative sensitivity between my system and those of the prior art. In this figure I have illustrated, by means of curves 101, a typical balance sensitivity characteristic of prior art balance-seeking devices or follow-up systems, such as, for example, a Selsyn or interlocked motor system.

In connection with this curve it is of importance to note that there exists a torque region 103 wherein the developed torque is less than the minimum requirement for rebalancing of a system. Such region may represent a substantial percentage of the system range of operation. Thus, in a Selsyn type of balance-seeking or follow-up systems, which may have a normal range of operation of 360°, the region 103 of insufficient torque development might cover an adjustment of as much as 30 or 40 degrees in which unbalance results in no equivalent system reaction. In this region the system is absolutely insensitive and unresponsive, and may represent a discrepancy between what happens at the control end, and what takes place at the controlled end as a result, and this constitutes a definite unpredictable error in the system operation.

A measure of the efficacy of a system of this type is indicated by the slope of line 105 joining the point 107 of maximum control effect and the origin. The steeper the slope of this line or the smaller the region of insensitivity, the less will be the error in the system between the control end and the controlled end thereof.

In my system, I have reduced the so-called region 103 of insensitivity to molecular dimensions measurable, if at all, by a difference in contact between a few molecules only, which in effect means that I have entirely eliminated such region of insensitivity, and this is indicated in Figure 5 by a vertical line 109 through the origin joining the positive torque curve 111 with the negative torque curve 113, such vertical line 109 representing the maximum steepness of slope possible. This characteristic imparts to my system infinite sensitivity and infinite amplification.

In starting up any system, one has no assurance that the system will be in the region of balance. An initially unbalanced condition of the system at the instant of starting will be indicated in my system by the disposition of the contacts 85—87. For example, a large unbalance in one direction will cause the contacts to occupy wide open positions, or have a wide angle of separation, while an unbalance in the opposite direction will result in the contacts being under relatively heavy pressure compared to that which exists during balance. Under these conditions, the motor may have an opportunity to pick up full speed before the contacts reach the balancing position, as a result of which a large amount of kinetic energy is stored up in the system upon reaching the balance point, which may cause over-shooting and a resulting hunting of the system. To avoid this, I provide means to anticipate this possibility, and bring about a torque reversal before the motor reaches the true balancing point, thus absorbing the kinetic energy and gradually decreasing the speed of the motor as it approaches the balancing point.

One specific mechanism for obtaining such advance reversal of torque is illustrated in Figures 2 and 3, to which reference will now be made. In these figures I have illustrated a speed reduction gear train 115 somewhat along the lines of that schematically illustrated in Figure 1, except that the contact 117 controlled thereby is flexible and is mounted on the end of an auxiliary hollow shaft 119. The other contact 118 is preferably rigid. The anticipation means is associated with contact 117 and includes a yoke 121 surrounding the contact and connected to one end of a shaft 123 passing through the auxiliary shaft 119 and terminating at the opposite end in a magnet 125.

Affixed to a small idler gear 127 at the end of the hollow shaft is an aluminum cup 129 extending over and enclosing the magnet 123, and about the aluminum cup I dispose an axially adjustable soft iron ring 131 which is adapted to be shifted into and out of the plane of the magnet, whereby to adjust or vary the air gap between the magnet and the soft iron ring and consequently that portion of the magnetic field which passes through the cylindrical portion of the aluminum cup 129.

As the motor operates and causes rotation of the gear train, the aluminum cup 129 will also be caused to rotate in accordance with the speed of the motor. The rotation of the aluminum cup will induce a drag upon the magnet 125 proportional to the rate of cutting of flux by the rotating cup, and such drag upon the magnet will result in a rotational effect thereon. This rotational effect will be transmitted through the shaft 123 to the yoke 121 which in turn will engage the contact 117 and cause it to flex in one direction or the other, depending upon the direction of drag effected by the direction of rotation of the aluminum cup.

It is noted, as a result of this drag, that the contact point 117 associated with the gear train will assume a position in advance of that which it would normally occupy if its position were controlled entirely by the gear train. This advance position is a direct result of the motor speed and proportional thereto. Thus, if the system is far off balance at the time of starting, sufficient to give the motor an opportunity to pick up substantial speed before it approaches the balance point, the contact 117 will accordingly be advanced so that molecular engagement between the contacts 117 and 118 will be effected in advance of the motor reaching the true balance point. The effect of this is to bring about a torque reversal before the true balance point is reached and this in turn causes the motor to slow down as it approaches the true balance point. In this manner, over-shooting of the balance point is effectively prevented.

The action of the anticipation means is depicted in the diagram of Figure 6. This diagram indicates a reversal of torque occurring at a substantial angle in advance of the true balance point which is represented by the vertical line through the origin, coinciding with the line 109. When the soft iron ring 131 of Figure 2 is adjusted for critical damping, the torque will reverse in advance of the motor reaching the true balance point and this is indicated in Figure 6 by the heavy dotted line 135 associated with the torque curve 111, and the light dotted line 137 associated with the torque curve 113 representing opposite direction of rotation. In other words, the full negative torque at critical damping is just sufficient to reduce the motor speed to zero at the balance point.

When the balance point has been reached by the motor, then the torque reversals necessary to maintain the motor in its "static condition of dynamic instability" occur within the microscopic "space" represented by the thickness of the line 109. In other words, the torque values fluctuate up and down the line 109 between the torque value represented by torque curve 111 and the torque value represented by the torque curve 113.

From the above description of a preferred embodiment of my invention, it will be apparent that the same fulfills all the objects of my invention as previously set forth. Accordingly, while I have devoted my description to a specific embodiment, the same is subject to alteration and modification without departing from the principles involved, and I therefore do not desire to be limited in my protection to the details set forth in the above description except as may be necessitated by the appended claims.

I claim:

1. In combination, an induction motor; means for supplying a voltage to one phase winding of said motor; means coupled thereto for deriving a voltage from said first means for application to a second phase winding of said motor, said second means including a coupling transformer, an amplifier having its input circuit coupled to the secondary of said transformer and its output circuit coupled to said second phase winding; a phase shift circuit intermediate said transformer and said amplifier, said phase shift circuit including a pair of contacts whose resistance characteristic curve showing the relationship between contact pressure and resistance includes a substantially vertical portion, means for controlling the relative positions of the contacts of said pair of contacts in accordance with the position of said motor and means for further changing the relative positions of the contacts of said pair of contacts in accordance with the direction and speed of rotation of said motor and in response to said rotation.

2. In combination, an induction motor; means for supplying a voltage to one phase winding of said motor; means coupled thereto for deriving a voltage from said first means for application to a second phase winding of said motor, said second means including a coupling transformer, an amplifier having its input circuit coupled to the secondary of said transformer and its output circuit coupled to said second phase winding; a phase shift circuit intermediate said first means and said second phase winding, said phase shift circuit including a pair of contacts whose resistance characteristic curve showing the relationship between contact pressure and resistance includes a substantially vertical portion; and means for changing the position of one of said pair of contacts in a direction corresponding with that of motor rotation and to an extent determined by the rotary speed of said motor, in response to rotation of said motor.

3. In combination, an induction motor; means for supplying a voltage to one phase winding of said motor; means coupled thereto for deriving a voltage from said first means for application to a second phase winding of said motor, said second means including an electronic amplifier and a phase shift circuit, said phase shift circuit including a pair of contacts whose resistance characteristic curve showing the relationship between contact pressure and resistance includes a substantially vertical portion; means responsive to motor rotation for varying said pressure while said contacts are close; and means for decreasing the relative spacing of said contacts in accordance with and in response to the speed of rotation of said motor while said contacts are open.

WILLARD C. ROBINETTE.

REFERENCES CITED

The following references are of record in the file of this patent:

UNITED STATES PATENTS

| Number | Name | Date |
|---|---|---|
| 1,664,265 | Rieber | Mar. 27, 1928 |
| 2,032,016 | Hitner | Feb. 25, 1936 |
| 2,505,258 | Robinette | Apr. 25, 1950 |